United States Patent [19]

Yamada et al.

[11] Patent Number: 4,748,466

[45] Date of Patent: May 31, 1988

[54] CAMERA PROVIDED WITH A LIGHT-SHIELDING MEANS

[75] Inventors: Minoru Yamada; Kenji Miyama, both of Hachioji; Masataka Sawamura, Hino; Eiji Ito, Hachioji, all of Japan

[73] Assignee: Konishiroku Photo Industry Co., Ltd., Tokyo, Japan

[21] Appl. No.: 913,135

[22] Filed: Sep. 29, 1986

[30] Foreign Application Priority Data

Oct. 3, 1985 [JP] Japan .................. 60-221243

[51] Int. Cl.$^4$ .................... G03B 3/00; G03B 17/04
[52] U.S. Cl. .................... 354/187; 354/195.12; 354/400
[58] Field of Search ............. 354/187, 195.1, 195.12, 354/400, 286

[56] References Cited

U.S. PATENT DOCUMENTS

| | | | |
|---|---|---|---|
| 2,208,797 | 7/1940 | Kende | 354/187 |
| 2,732,776 | 1/1956 | Meixner | 354/187 |
| 3,585,916 | 6/1971 | Lange | 354/187 |
| 4,213,686 | 7/1980 | Kellner | 354/195.1 |
| 4,264,173 | 4/1981 | Kurukawa et al. | 354/187 |
| 4,536,068 | 8/1985 | Kodaira | 354/195.12 |

Primary Examiner—A. A. Mathews
Attorney, Agent, or Firm—Jordan B. Bierman

[57] ABSTRACT

A light-shielding apparatus of a camera having a collapsible barrel provides a fixed cylindrical light-shielding member between a movable portion of the collapsible barrel and a frame of a camera body. The outer surface of the light-shielding fixed member can be overlapped with the movable portion.

7 Claims, 5 Drawing Sheets

CAMERA PROVIDED WITH A LIGHT-SHIELDING MEANS

FIELD OF THE INVENTION

The present invention relates to a light-shielding apparatus of a camera, e.g., a bifocal camera, which includes a retractable or collapsible barrel.

BACKGROUND OF THE INVENTION

In order to enlarge and photograph a remote object to be photographed, a telephoto lens having a long focal length must be attached to a conventional lens interchangeable cameras which has been widely used. However, it is cumbersome for a user to carry and interchange lenses, so that a camera capable of selecting one of two focal lengths with simple operation has been developed recently.

A bifocal camear of this type incorporates two optical systems having different focal lengths inside the camera, and a user manually selects either of the two optical system before photographing. Although a selecting operation of the optical systems is simpler than conventional lens interchanging in such a bifocal camera, it takes a certain period of time. Therefore, a user may lose a good shutter chance when an object to be photographed is moved, and it is difficult to select a focal length while framing.

The present inventors have proposed a bifocal camera wherein a single optical system is commonly used and a motor is started upon operation of the button to move the main lens unit in the back-and-forth direction, and at the same time an auxiliary lens is inserted in or removed from an optical path, thereby automatically selecting a focal length (Japanese Patent Application No. 60-100381).

Most conventional collapsible lens barrels incorporated in a camera of this type having a main lens unit moved in the back-and-forth direction constitute a movable lens unit which is supported and guided by a linear guide member obtained by fixing a movable barrel to a camera body, and in which a lens unit attached thereto is moved in a direction of the optical axis.

This movable lens unit is located at different positions with respect to a camer a body in a collapsed (withdrawn) state and in an extended state. Since a large space is formed in front of a frame of the camera body in the extended state, external light tends to enter through a front body or an outer cover attached to the camera body and reach the film surface. Therefore, a light-shielding member must be provided between the movable lens unit and the frame.

In this light-shielding member, since light shielding must be maintained regardless of whether the movable lens unit is in the collapsed or extended state with respect to the camera body, a fixed light-shielding member cannot be used. For this reason, a bellows type light shielding member has been proposed in Japanese Utility Model Disclosure No. 59-68327.

However, it is difficult to manufacture the bellows itself in a mass production line, and the bellows has poor durability. In addiition, it is difficult to obtain a barrel unit because an opening at the back of the bellows must be connected to the camera body directly, thus presenting many manufacturing problems, e.g., low assembly efficiency.

Moreover, it is impossible to support or guide mechanical and electrical members for connecting the barrel with the camera body because the barrel itself is flexible, resulting in a big disadvantage in terms of a camera construction.

SUMMARY OF THE INVENTION

An object of the present inventon is to provide a light-shielding apparatus of a camera, wherein a fixed light-shielding member manufactured with ease and suitable for mass production is provided between a movable lens unit and a frame of a body, thereby allowing assembling of a collapsible barrel unit.

The above object is achieved in a camera having a collapsible barrel by a light-shielding apparatus of a camera characterized by providing a fixed cylindrical light-shielding member between a movable portion of the collapsible barrel and a frame of the camera body.

DETAILED DESCRIPTION OF THE PREFERRED EMBODIMENTS

The present invention will now be described with reference to the accompanying drawings.

Figure 1:
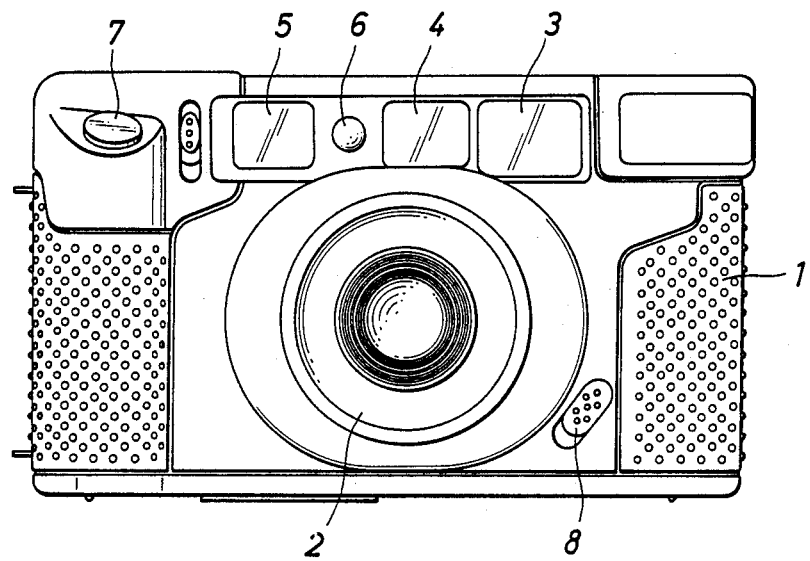
FIG. 1 is a front view of a bifocal camera which adopts a light shielding apparatus according to the present invention.
Figure 2A:
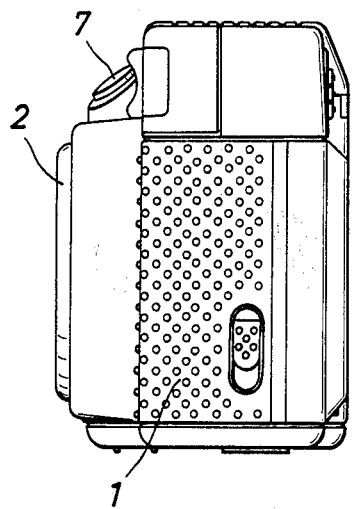
FIG. 2A is a side view of a collapsed state of a lens barrel of the camera in FIG. 1.
Figure 2B:
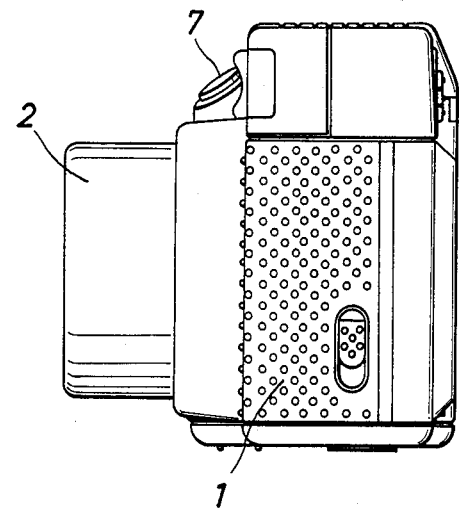
FIG. 2B is a side view of an extended state of the lens barrel of the camera in FIG. 1.

FIG. 1 is a front view of an embodiment of a bifocal camera according to the present invention, and FIGS. 2A and 2B are side views of the camera in two states having different focal lengths. Reference numeral 1 denotes a camera body; 2, a lens barrel provided in front of the camera body 1 to be movable in the back-and-forth direction; 3, a viewfinder; 4 and 5, distance measuring windows; 6, a light receiving element such as CdS; 7, a two-step release button which performs distance measuring, light metering, battery check, and position check and correction of a lens unit to be described later in first step depression, and in second step depression, moves the lens unit or drives a shutter; and 8, an automatic return type focal length select button. When the button 8 is depressed in a direction indicated by an arrow, the barrel is extended as shown in FIG. 2B from the collapsed state as shown in FIG. 2A, or vice versa.

An embodiment of the light-shielding apparatus of the above bifocal camera will be described with reference to FIGS. 1 to 4.

Figure 3:
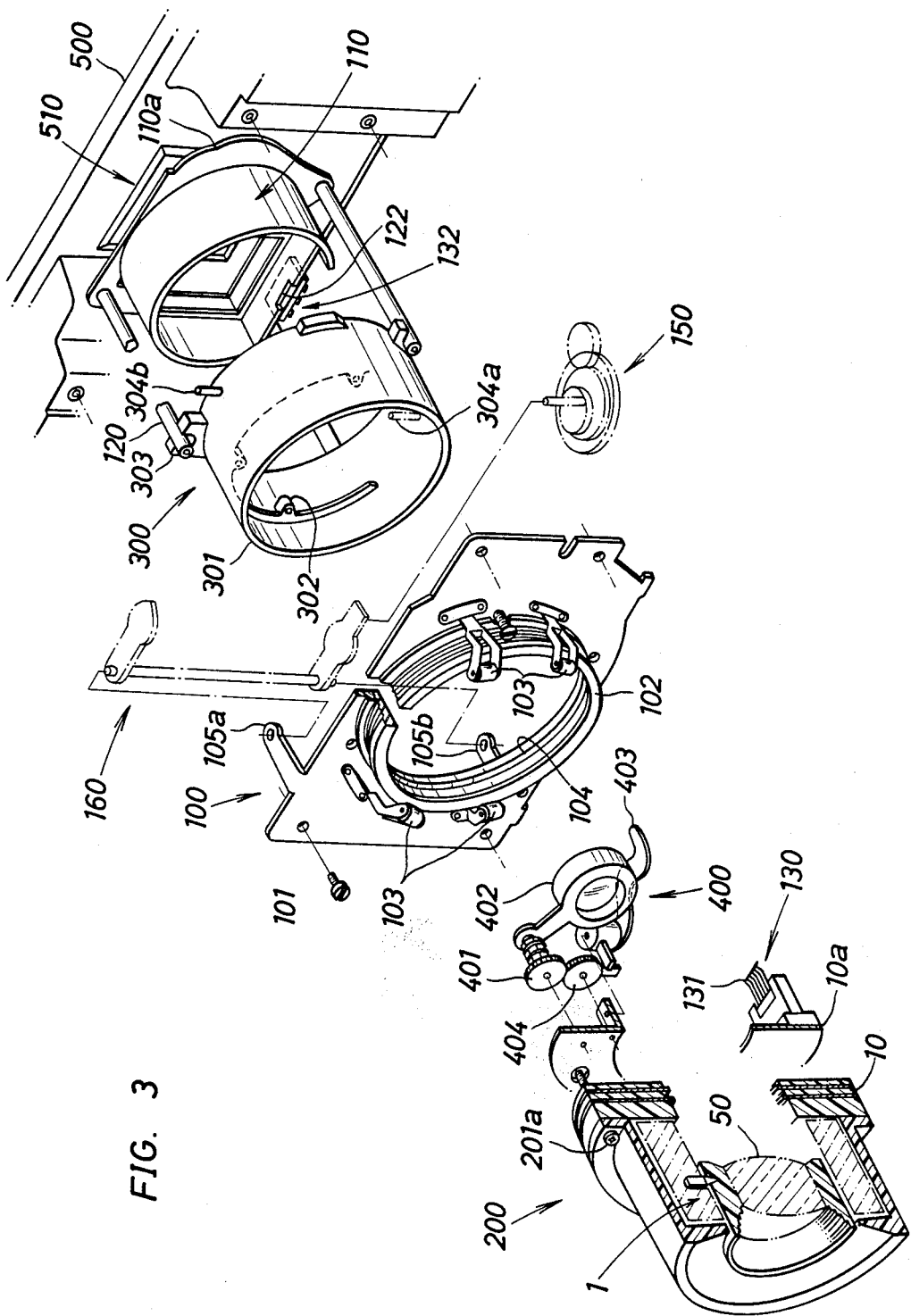
FIG. 3 is an exploded perspective view of an embodiment of the light-shielding apparatus according to the present invention.

FIG. 3 is a view exploded in a direction of the optical axis for showing an arrangement of a collapsible barrel to which a bifocal lens is mounted. An internal unit 200 and an external unit 300, which constitute a movable portion of the collapsible barrel, are incorporated in a front body 100 and then mounted in front of a camera body 500 with a plurality of small screws 101, so that the internal and external units 200 and 300 are connected to a mechanical power source, an electrical power source, or a control section of the camera body 500 to perform their functions.

The internal unit 200 is an optical system block in the movable portion. The internal unit 200 consists of an electromagnetic shutter 10, a photographing lens 50 mounted in front of the electromagnetic shutter 10, an automatic focusing apparatus 1, a conversion lens unit 400 of a bifocal lens system mounted on a base plate 10a at the back of the automatic focusing apparatus 1, and a slidable contact apparatus 130 for connecting the electromagnetic shutter 10 and the automatic focusing apparatus 1 with the electric power souce or the control section of the camera body 500. The internal unit 200 is mounted to a barrel 301 (to be described later) of the external unit 300 with three small screws 201a.

Figure 5:
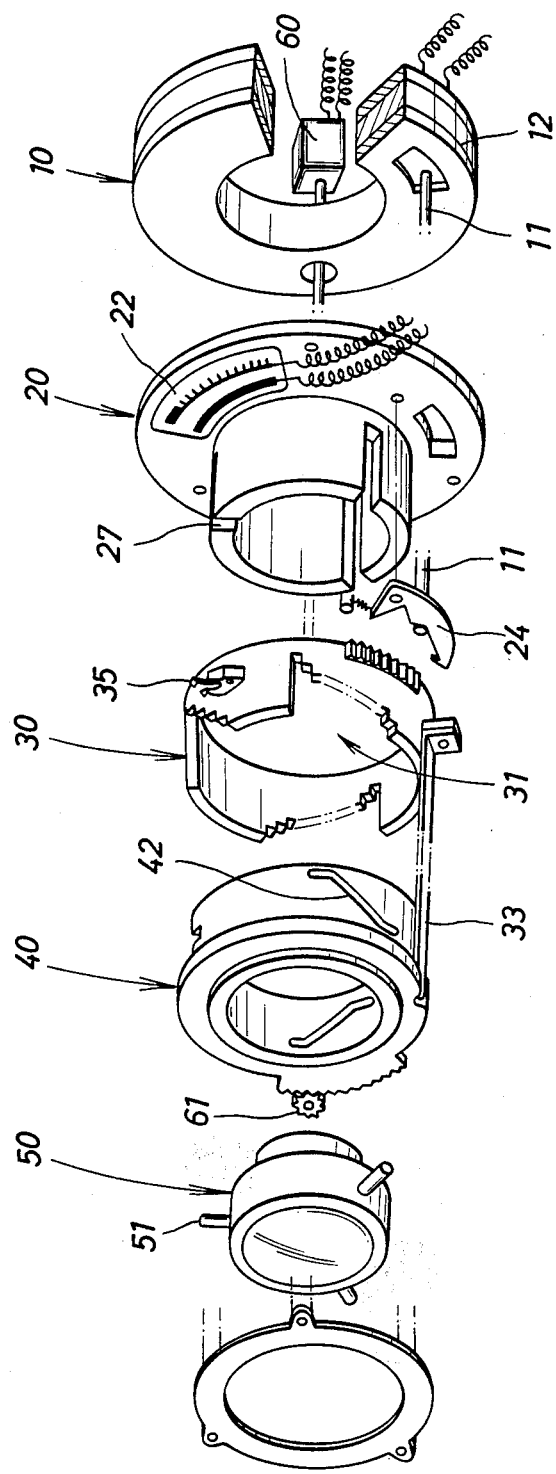
FIG. 5 is an exploded perspective view of the lens barrel of the light-shielding apparatus according to the present invention.

The automatic focusing apparatus 1 having an arrangement as shown in FIG. 5 is incorporated.

When a motor 60 ie energized and rotated by power supplied from the camera body to rotate a lens drive member 40 clockwise through a pinion 61, a photographing lens 50 is moved backward in an optical axis direction along a linear groove 27 of a lens guide 20 through a pin 51 fitted in a groove cam 42 of the lens drive member 40.

At the same time, a lens positioning member 30 is rotated clockwise by engagement of a biasing spring 33, and an on-off operation of a contact 35 and a printed board 22 of the lens guide 20 generates a pulse signal which is sent to the camera body. The position of the photographing lens 50 in the optical axis direction corresponding to the pulse signal is compared with a distance to an object to be photographed detected by a distance measuring apparatus of the camera body. When the position coincides with the distance, a movable coil member 12 of the electromagnetic shutter 10 is energized to actuate a stopper 24 through a pin 11 so as to lock the lens positioning member 30 and stop its rotation.

The position on the optical axis where the photographing lens 50 is to be stopped is set by a stepped cam 31 of the lens positioning member 30. The photographing lens 50 is disengaged from the biasing spring 33, and the pin 51 thereof is moved to abut against the step cam 31 by the lens drive member 40 which rotates clockwise. Thus, the photographing lens 50 reaches a predetermined position on the optical axis to obtain a just-in-focus state.

A contact 131 of the sliding contact apparatus 130 is brought into contact with a contact 132 attached to a lower portion of a light-shielding cylinder 110 serving as a fixed cylindrical light-shielding member according to the present invention to be described later, thereby supplying electrical power from the camera body for operating the automatic focusing apparatus 1 or driving the electromagnetic shutter 10. When the internal unit 200 is moved in the direction of the optical axis, the electrical power is maintained by a sliding effect of the contacts 131 and 132.

The light-shielding cylinder 110 is a cylindrical member having a flange 110a and connected integrally with the front body 100 by three linear guide shafts 120. When the front body 100 is attached to the camera body 500, the light-shielding cylinder 110 is positioned between a rear end portion of the barrel 301 and a frame 510 of the camera body 500 and serves as a light-shielding apparatus for preventing light from entering into a photographic optical path.

The incorporated conversion lens unit 400 is arranged such that a conversion lens 402 formed integrally with a gear 401 rotatably supported by the base plate 10a of the electromagnetic shutter 10 can be inserted in or removed from the optical path of the photographing lens 50 by pivoting a crank lever 403 rotatably supported by the base plate 10a through a gear 404. In order to pivot the crank lever 403, the distal end of the crank lever 403 is brought into contact with or separated from a butt 122 which is provided at the light-shielding cylinder 110 mounted to the front body 100 as the internal unit 200 is collapsed or extended with respect to the camera body 500.

The external unit 300 has a barrel 301 as a main body which is obtained by attaching and fixing the internal unit 200 in the movable portion so as to be collapsed or extended as a whole with respect to the camera body. The barrel 301 is positioned between the front body 100 and the light-shielding cylinder 110. Guide portions 303 provided at three positions of the outer surface of the barrel 301 can be slidably engaged with three linear guide shafts 120 serving as guide members for connecting and integrating the front body 100 with the light-shielding cylinder 110, so that the barrel 301 can be moved in a direction perpendicular to the frame of the camera body.

Figure 6:
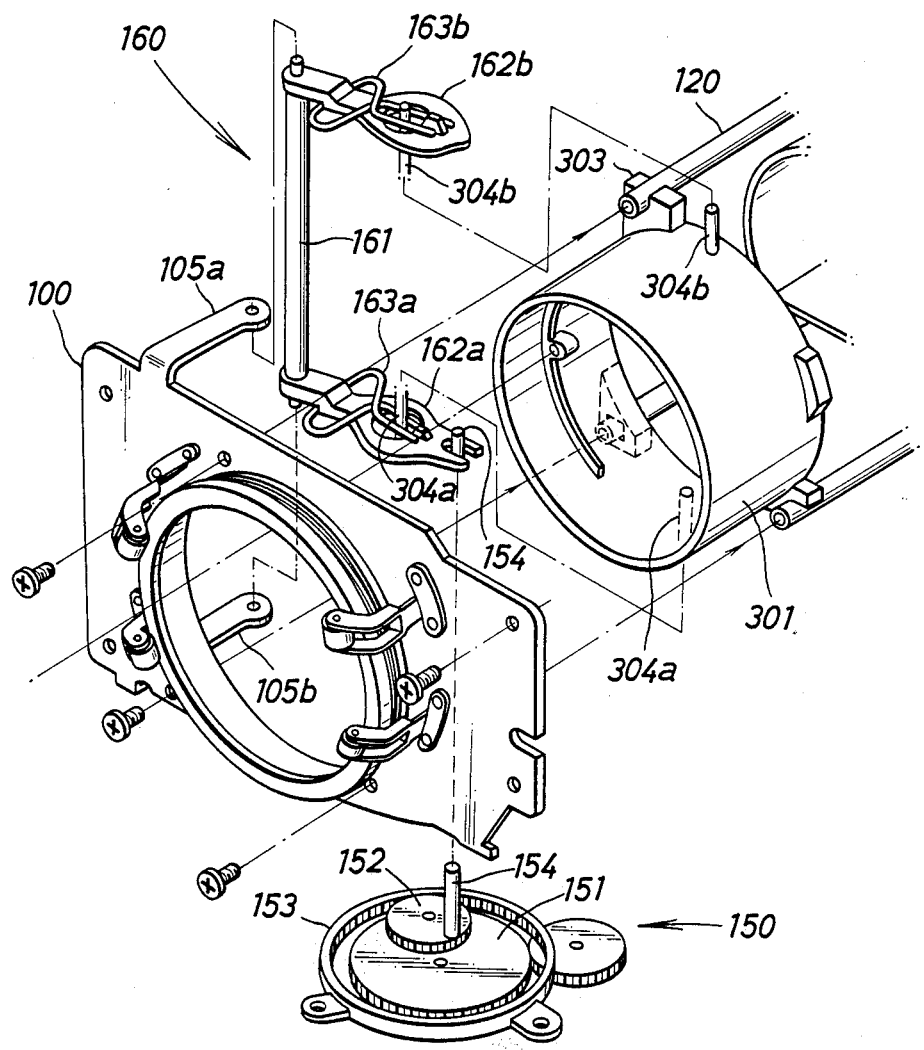
FIG. 6 is a perspective view of a drive system of the lens barrel.

The abarrel 301 is provided at its inner surface with three screw holes 302 to which small screws for mounting the internal unit 200 are screwed and at its bottom and side portions with a planet gear mechanism 150 serving as a drive source as shown in FIG. 6 for collapsing or extending the barrel 301 and hence the internal unit 200 and a lens drive apparatus 160, which is movably supported by arms 105a and 105b of the front body 100, for transmitting mechanical power of the planet gear mechanism 150 to the barrel 301.

The barrel 301 is collapsed and extended as follows. While the gear 151 is rotated half a revolution by mechanical power from the camera body, the planet gear 152 rotatably supported by the gear 151 is meshed with an internal gear 153, rotated about its axis, and at the same time rotated about the axis of the internal gear 153 so as to move a drive pin 154 extending on a peripheral portion of the planet gear 152 by an angular distance. The above movement is transmitted to a lever 162a at the lower end of a connecting shaft 161 and is also transmitted to a lever 162b at the upper end of the connecting shaft 161 through the connecting shaft 161. Therefore, uniform driving force and actuation amount are transmitted to moving pins 304a and 304b projecting on the surface of the barrel 301 through springs 163a and 163b attached to the levers 162a and 162b, respectively.

As a result, the barrel 301 can be collapsed and extended in a well-balanced manner throughout the peripheral surface. Further, by utilizing the elastic force of springs 163a and 163b, the barrel 301 can be urged strongly against a limit position of its stroke, thereby moving the internal unit 200 accurately and sufficiently. Accordingly, the crank lever 403 of the conversion lens 400 abuts against the butt 122 of the light-shielding cylinder 110 and urged to a predetermined stroke so as to move the conversion lens 402 outside the optical path of the photographing lens 50 accurately and smoothly.

In addition, the crank lever 403 is removed from the butt 122 and the conversion lens 402 is accurately and smoothly moved into the optical path of the photographing lens 50 by its own biasing force for selecting its focal length.

Note that the outer surface of the barrel 301 is loosely fitted in the inner surface of a mount 102 of the front body 100 and a distal end portion thereof is always urged toward the center by four rollers 103 attached to a front surface of the front body 100. A space between the barrel 301 and the mount 102 is light-shielded by the elastic light-shielding member 104 buried in the inner surface of the mount 102.

A light-shielding function of the light-shielding cylinder 110 according to the present invention, which is effected in accordance with movement of the barrel 301 as a movable portion in the collapsible barrel having the above arrangement, will now be described.

Figure 4A:
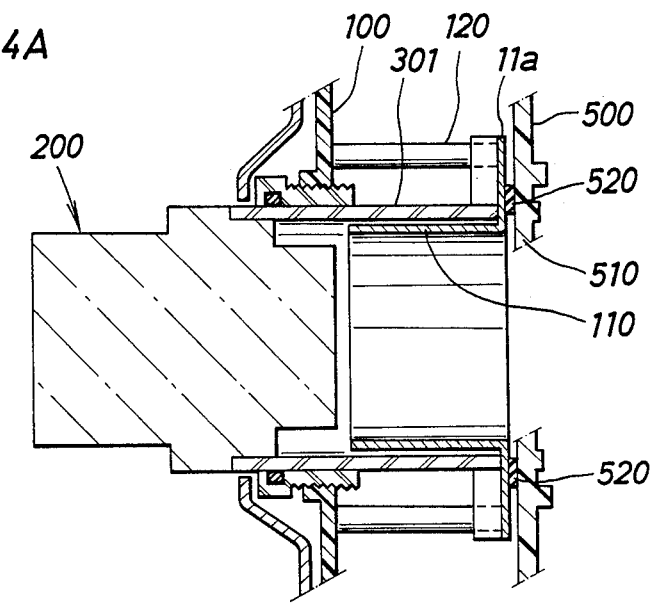
FIG. 4A is a sectional view of the lens barrel in the collapsed state.
Figure 4B:
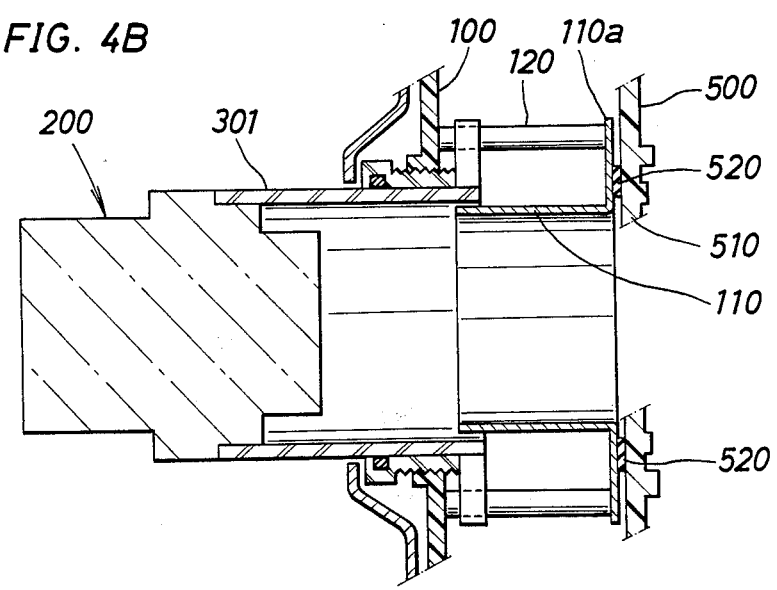
FIG. 4B is a sectional view of the lens barrel in the extended state.

FIGS. 4A and 4B are secitonal views of the collapsible barrel. In FIG. 4A, the barrel 301 is in a collapsed state the the conversion lens 400 is moved outside the optical axis to form an optical sysem having a short focal length only with the photographic lens 50. In FIG. 4B, the barrel 301 is in an extended state and the photographing lens 50 and the conversion lens 400 are combined to form an optical system having a long focal length.

The light-shielding cylinder 110 is slightly separated from the camera body 500 to allow proper assembly of the front body 100. However, since a frame-like flexible black molt plain material 520 is adhered to the camera body 500, light is prevented from entering behind the light-shielding cylinder 110 by urging the black molt plain material 520 with the flange 110a.

The outer surface of the light-shielding cylinder 110 is located at an overlapping position and slightly separated from the inner surface of the barrel 301. A length of the above overlapping portion in the direction of the optical axis is formed substantially longer than a withdrawn amount of the barrel 301, i.e. a collapsed amount of the collapsible barrel.

Therefore, as shown in FIG. 4B, even when the barrel 301 is withdrawn and occupies the frontmost position in the direction of the optical axis, an overlapping portion is formed between a front end portion of the light-shielding cylinder 110 and a rear end portion of the barrel 301. Thus, if light enters through the front body 100 or the other camera cover members, it is shielded by the light-shielding cylinder 110 and cannot reach the frame 510 of the camera body 500.

Note that if the inner surface of the light-shielding cylinder 110 is subjected to nonglossy black finish and an antireflection helical groove is formed therein to minimize reflection, it is not difficult to obtain a antireflection effect practically corresponding to that obtained by the bellows.

The present invention makes it possible to completely prevent light from entering into a variable photographic optical path formed between the collapsible barrel and the camera body by an extremely simple light-shielding member. The light-shielding member can be manufactured with ease and has high durability. By using the above light-shielding member, the barrel can be assembled as a unit independent of the camera body. In addition, since the light-shielding member is fixed, electric components such as a connector may be provided to or mechanical components can be incorporated in the movable internal unit 200 as needed, as in the embodiment described above. As a result, a collapsible barrel can be manufactured at low cost, and a light-shielding apparatus of a camera in which inspection and repair can be very easily performed is provided.

In the above embodiment, the light-shielding apparatus according to the present invention is applied to a bifocal camera, however, it is obvious that the present invention is not limited to the bifocal camera but can be applied to cameras of other types.

What is claimed is:

1. A camera provided with a lens having a first optical axis forming an optical path and a light-shielding apparatus and having a collapsible barrel wherein a fixed, cylindrical light-shielding member is provided between a movable portion of said barrel and a frame of the camera body, said member terminating adjacent a film surface, said barrel surrounding said member and with respect thereto, along said first optical axis between a projecting position in which said barrel extends from said camera and a collapsed position wherein said barrel is retracted into said camera, there being a clearance between said barrel and said member, said barrel at least partially overlapping said member when in said projecting position.

2. The camera of claim 1 wherein said barrel slides on at least one guide shaft which guide shaft is fixed relative to said body and is outside said barrel.

3. The camera of claim 1 wherein the rear end of said barrel is adjacent said frame when said barrel is in said collapsed position.

4. The camera of claim 1 wherein said member has a flange on its end adjacent said surface.

5. The camera of claim 4 wherein the rear end of said barrel abuts said flange when said barrel is in said collapsed position.

6. The camera of claim 1 comprising an automatic focusing device mounted on said camera and adapted for axial focusing movement, a first slidable contact on said device, a second slidable contact on said member and adapted to mate with said first contact, whereby electrical power from said camera body is supplied to said automatic focusing device.

7. The camera of claim 1 comprising a conversion lens adapted for movement into and out of said optical path, said conversion lens being in said optical path when said barrel is in said projecting position.

* * * * *